US012055894B2

(12) United States Patent
Zaugg

(10) Patent No.: US 12,055,894 B2
(45) Date of Patent: Aug. 6, 2024

(54) NATURAL ESCAPEMENT FOR A HOROLOGICAL MOVEMENT AND HOROLOGICAL MOVEMENT COMPRISING SUCH AN ESCAPEMENT

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 391 days.

(21) Appl. No.: 17/563,557

(22) Filed: Dec. 28, 2021

(65) Prior Publication Data

US 2022/0283543 A1 Sep. 8, 2022

(30) Foreign Application Priority Data

Mar. 2, 2021 (EP) .................................... 21160261
May 3, 2021 (EP) .................................... 21171889

(51) Int. Cl.
*G04B 15/14* (2006.01)
*G04B 17/06* (2006.01)

(52) U.S. Cl.
CPC ........... *G04B 15/14* (2013.01); *G04B 17/063* (2013.01)

(58) Field of Classification Search
CPC ....... G04B 15/00; G04B 15/14; G04B 17/063
See application file for complete search history.

(56) References Cited

U.S. PATENT DOCUMENTS 6,708,576 B2 * 3/2004 Oechslin ................ G04B 15/06 74/1.5
6,802,645 B2 * 10/2004 Ludwig .................. G04B 15/02 74/1.5
7,604,395 B2 * 10/2009 Cabezas Jurin ....... G04B 15/06 368/127
7,607,822 B2 * 10/2009 Cabezas Jurin ....... G04B 15/06 368/127

(Continued)

FOREIGN PATENT DOCUMENTS

CH 709 328 A2 9/2015
CH 712 631 A1 12/2017

(Continued)

OTHER PUBLICATIONS

European Search Report for EP 21 17 1889 dated Sep. 30, 2021.

*Primary Examiner* — Edwin A. Leon
*Assistant Examiner* — Jason M Collins
(74) *Attorney, Agent, or Firm* — Sughrue Mion, PLLC

(57) ABSTRACT

A natural escapement (1) for a horological movement, including a first escapement wheel (8) driven by a second mobile (2), the first escapement wheel (8) in turn driving a second escapement wheel (12) arranged in the same plane as the first escapement wheel (8), an anchor (30) capable of pivoting around an anchor rod (32), the anchor (30) being arranged to temporarily locking the first escapement wheel (8) during a first alternation, and to temporarily locking the second escapement wheel (12) during a second alternation, the anchor rod (32) being located outside an angle (α) less than 180° and delimited by two straight lines which pass (Continued)

through the axis (20) of the balance wheel (18) and through a pivot axis (6) of the first escapement wheel (8), and through the axis (20) of the balance wheel (18) and through a pivot axis (14) of the second escapement wheel (12).

12 Claims, 6 Drawing Sheets

(56) References Cited

U.S. PATENT DOCUMENTS 8,562,205 B2 * 10/2013 Journe .................. G04B 15/14
368/131

FOREIGN PATENT DOCUMENTS

| | | | |
|---|---|---|---|
| CH | 714 200 | A1 | 3/2019 |
| DE | 24 58 503 | A1 | 6/1976 |
| EP | 1 221 637 | A1 | 7/2002 |

* cited by examiner

NATURAL ESCAPEMENT FOR A HOROLOGICAL MOVEMENT AND HOROLOGICAL MOVEMENT COMPRISING SUCH AN ESCAPEMENT

CROSS-REFERENCE TO RELATED APPLICATIONS

This application claims priority to European Patent Application No. 21160261.0 filed Mar. 2, 2021 and European Patent Application No. 21171889.5 filed May 3, 2021, the entire contents of which are incorporated herein by reference.

TECHNICAL FIELD OF THE INVENTION

The present invention relates to a natural escapement for a horological movement also known by its name tangential impulse escapement. The present invention also relates to a horological movement comprising such an escapement.

TECHNOLOGICAL BACKGROUND

The principle of the natural escapement was devised by Abraham Louis Breguet in the early 19th century. The advantage of the Breguet's natural escapement is in particular that it is a free escapement in so far as the balance is only disturbed by the operation of the escapement over a small fraction of its oscillation. The advantage of the Breguet's natural escapement is also that it gives each alternation an impulse which is direct and tangential to the balance. In other words, energy is transferred directly from the escapement wheel to the balance, without going through an anchor. Moreover, the energy is transmitted only tangentially, so that the frictions generated by the operation of this escapement are limited. Unlike the balance of a detent escapement, the balance of a natural escapement does not have a coup perdu; it receives a similar impulse with each alternation, in a symmetrical and more uniform manner, so that the losses of mechanical energy per coup perdu are suppressed. All these qualities make the natural escapement potentially one of the most efficient.

Breguet nevertheless subsequently discovered that the natural escapement he had imagined had certain disadvantages, foremost among which mention may be made of the fact that the last escapement wheel is not under the tension of the geartrain when the first wheel provides the impulse or when the latter is at rest. The various sets of geartrains and the quality of manufacture of the various components used in the composition of a Breguet's natural escapement can thus cause incorrect positioning of the last escapement wheel and, consequently, a malfunction of the escapement accompanied with parasitic noises. Furthermore, since the escapement wheel is free, its position is unstable, so that the operational safety of such a natural escapement is poor.

Of course, many improvements have been made to the original Breguet's natural escapement in an attempt to overcome the disadvantages mentioned above. Nevertheless, despite the efforts of successive watch manufacturers, difficulties remain. Some watchmakers have thus proposed to superimpose the two escapement wheels, a solution which, of course, increases the thickness of the movement and makes it difficult to integrate such a movement into a watch case. Other watch manufacturers have, in turn, proposed positioning the anchor between the two escapement wheels, in the plane of the latter. Here too, such a solution is bulky, this time in the plane of the movement. In addition, whether the escapement wheels are superimposed or the anchor is disposed between the two escapement wheels, it has been realised in practice that watchmakers have difficulty in accessing the various components of the escapement, in particular when it came to adjusting the depth of penetration of the teeth of the first and second escapement wheel with the exit and entry pallets of the anchor.

SUMMARY OF THE INVENTION

The purpose of the present invention is to overcome the problems mentioned above as well as others by providing a natural escapement for a horological movement which is in particular less bulky and the anchor of which is more easily accessible for measurement and adjustment.

To this end, the present invention relates to a natural escapement for a horological movement performing a succession of operating cycles each composed of a first and a second alternation of a balance which comprises a balance wheel as well as a balance plate adjusted on an axis of the balance wheel, this natural escapement comprising a first escapement wheel arranged to be driven by a second mobile, this first escapement wheel in turn driving a second escapement wheel arranged in the same plane as the first escapement wheel, an anchor capable of pivoting around an anchor rod, this anchor comprising means for temporarily locking the first escapement wheel during the first alternation, and means for temporarily locking the second escapement wheel during the second alternation, the anchor rod being located outside an angle less than 180° and delimited by two straight lines which pass through the axis of the balance wheel and through a pivot axis of the first escapement wheel for one, and through the axis of the balance wheel and through a pivot axis of the second escapement wheel for the other.

According to special embodiments of the invention:

- the anchor comprises a first stop pallet for temporarily locking the first escapement wheel during the first alternation, and a second stop pallet for temporarily locking the second escapement wheel during the second alternation;
- the balance plate carries a balance pin by which this balance plate causes the anchor to pivot at each of the first and second alternations, the balance plate also carrying a second impulse pallet through which this balance plate receives a direct and tangential driving impulse from the second escapement wheel during the first alternation, and a first impulse pallet through which this balance plate receives a direct and tangential driving impulse from the first escapement wheel during the second alternation, the balance pin being located outside an acute angle delimited by two straight lines which pass through the axis of the balance wheel and through the first impulse pallet for one, and through the axis of the balance wheel and through the second impulse pallet for the other;
    - the first escapement wheel comprises a toothing which extends in a single plane and through which this first escapement wheel meshes with the second escapement wheel and provides the direct and tangential driving impulse to the balance plate during the second alternation;
    - the second escapement wheel comprises a toothing which extends in a single plane and through which this second escapement wheel meshes with the first escapement wheel and provides the direct and tangential driving impulse to the balance plate during the first alternation;

the anchor comprises a fork formed of a first and a second horn, the balance plate abutting by its balance pin against the first horn of the fork and causing the pivoting of this anchor in a first direction during the first alternation, and against the second horn during the second alternation, causing the anchor to pivot in a second direction opposite to the first direction;

the fork carries a dart which cooperates with the balance plate to prevent accidental movements of the fork;

the first and second escapement wheels are each made in one piece and each comprise a single level of toothing.

The invention also relates to a horological movement comprising a natural escapement of the type described above.

Thanks to these features, the present invention provides a natural escapement wherein the anchor which alternately locks and releases the first escapement wheel and the second escapement wheel has its anchor rod located outside an angle less than 180° and delimited by two straight lines which pass through the axis of the balance wheel and through a pivot axis of the first escapement wheel for one, and through the axis of the balance wheel and through a pivot axis of the second escapement wheel for the other. This solution, much less bulky and therefore easier to be housed in a horological movement than when the anchor is disposed between the two escapement wheels, also offers easier access to watchmakers and allows them to more conveniently measure and adjust the depth of penetration of the teeth of the first and second escapement wheels with the first and second stop pallets of the anchor, as well as the heights of the escapement wheels facing the impulse pallets of the balance. Moreover, the first and second escapement wheels are each made in one piece and each comprise a single level of toothing. In other words, these first and second escapement wheels are not active at two distinct staged levels. They are therefore less bulky and easier to be machined. In addition, the necessary indexing of the teeth used to transmit driving impulses to the balance plate when using two superimposed escapement wheels is avoided. Indeed, in the case of the invention, the indexing of the single toothing of the first and second escapement wheels which ensures both the engagement of these two drive wheels with one another and the transmission of the driving impulses to the balance plate results from the very shape of this toothing.

BRIEF DESCRIPTION OF THE FIGURES

Other features and advantages of the present invention will emerge more clearly from the following detailed description of an embodiment of a natural escapement according to the invention, this example being given in a purely illustrative and non-limiting manner only in conjunction with the appended drawing wherein.

DETAILED DESCRIPTION OF THE INVENTION

Figure 1:
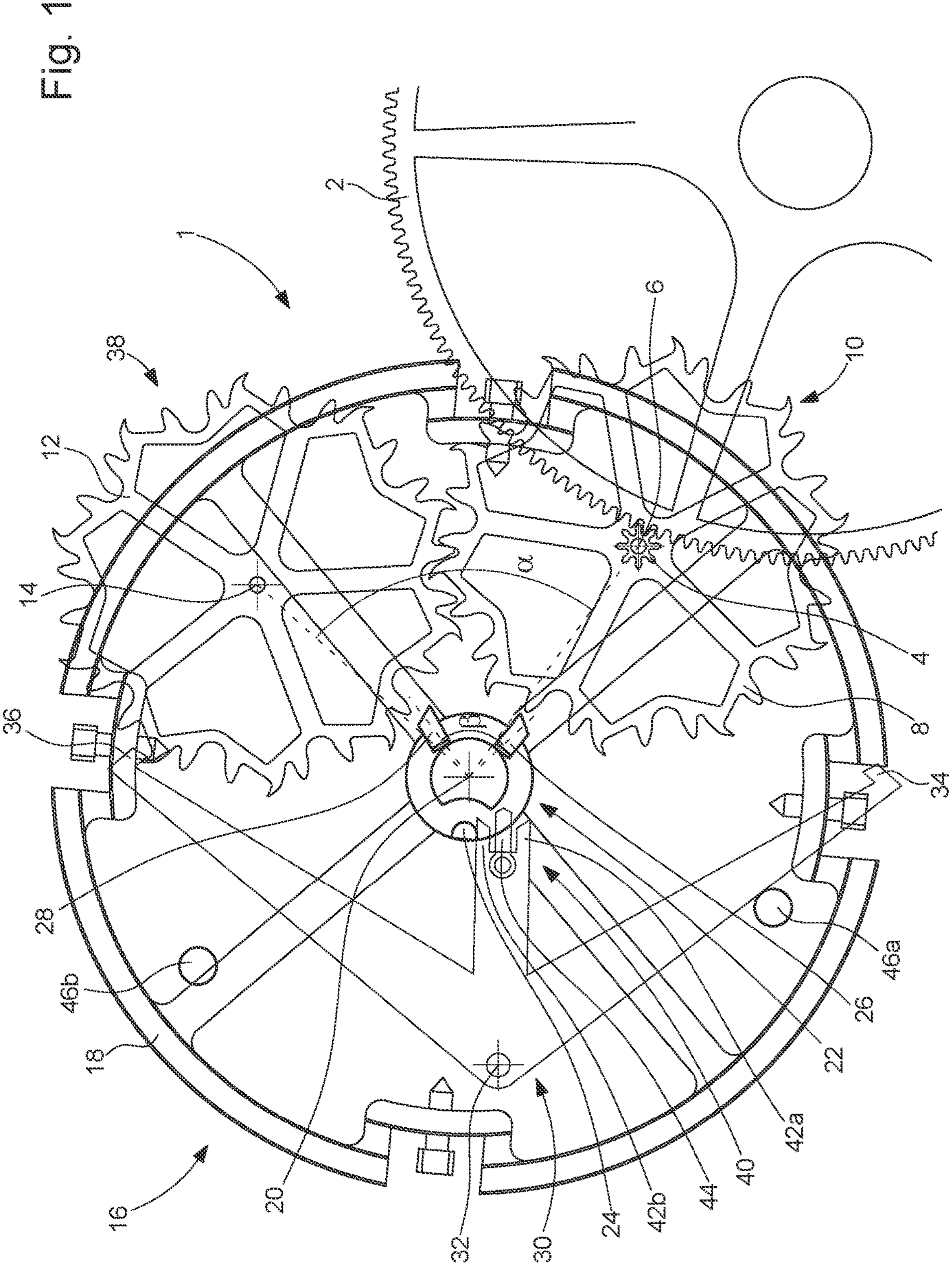
FIG. 1 is an overview of the natural escapement according to the invention.

The present invention proceeds from the general inventive idea which consists in disposing the anchor of a natural escapement also known by its name tangential impulse escapement, so that its anchor rod is located outside an angle less than 180° and delimited by two straight lines which pass through the axis of the balance wheel and through a pivot axis of the first escapement wheel for one, and through the axis of the balance wheel and through a pivot axis of the second escapement wheel for the other. Such an arrangement, much less bulky than when the anchor of the natural escapement is disposed between the escapement wheels, also offers the watchmaker easier access to the first and second stop pallets of the anchor and therefore more convenience to measure and adjust the depth of penetration of these pallets into the teeth of the first and second escapement wheels. This arrangement also allows to easily see the escapement wheels as they impart the driving impulse to the impulse pallets of the balance plate and therefore allows the height of these escapement wheels to be adjusted more easily. Likewise, since the first and second escapement wheels are only active on a single level, they are thinner and therefore less bulky and easier to be machined. Furthermore, the indexing of their impulse teeth results from the very shape of their toothing and not from a tedious assembly of two superimposed escapement wheels.

Designated as a whole by the general reference numeral 1, the natural escapement according to the invention is arranged to be driven by a second mobile 2 which meshes with a pinion 4 fixedly mounted on an axis 6 of a first escapement wheel 8. This first escapement wheel 8 in turn meshes via a toothing 10 with a second escapement wheel 12 which pivots about an axis 14.

The natural escapement 1 also comprises a balance 16 which comprises a balance wheel 18 on an axis 20 of which is adjusted a balance plate 22. This balance plate 22 carries a balance pin 24 as well as a first and second impulse pallet 26 and 28, the respective roles of which will be described below.

The natural escapement 1 according to the invention finally comprises an anchor 30 pivoted around an anchor rod 32 and which carries a first stop pallet 34 and a second stop pallet 36. These first and second stop pallets 34 and 36 can be integrally made with the anchor 30 or else be attached to this anchor 30 in the shape of two separate parts. Thanks to these first and second stop pallets 34 and 36 which respectively penetrate into the toothing 10 of the first escapement wheel 8 and into a toothing 38 of the second escapement wheel 12, the anchor 30 is able to alternately lock and release these first and second escapement wheels 8 and 12. The anchor 30 also comprises a fork 40 formed of a first and a second horn 42*a* and 42*b* and which carries a dart 44. This dart 44 cooperates with the balance plate 22 and has the function of preventing accidental movements of the fork 40 outside periods during which the balance plate 22 is in its rest position.

According to the invention, the pivot point of the anchor 30, materialised by the anchor rod 32, is located outside the angle α less than 180° and delimited by two straight lines which pass through the axis 20 of the balance wheel 18 and through the axis 6 of the first escapement wheel 8 for one, and through the axis 20 of the balance wheel 18 and through the axis 14 of the second escapement wheel 12 for the other. The natural escapement 1 according to the invention is therefore less bulky than the natural escapements of the prior art wherein the anchor is usually placed between and above the first and second escapement wheels. The natural escapement 1 according to the invention is therefore easier to be housed in the horological movement and regulates the operation of said horological movement. Likewise, the arrangement of the anchor 30 outside the angle α less than 180° makes the interventions of the watchmaker less difficult, in particular as regards measurement and adjustment of the depth of penetration of the first and second stop pallets 34 and 36 into the toothing 10 and 38 of the first and second escapement wheels 8 and 12, and measurements and adjustments of the heights of the first and second wheels 8 and 12 relative to the first and second impulse pallets 26 and 28 of the balance plate 22. The natural escapement 1 is completed by a first and a second abutment 46*a* and 46*b* which limit the pivoting displacement of the anchor 30.

In the embodiment of the natural escapement 1 according to the invention illustrated in the drawing, assumption is made that the second mobile 2 which supplies the natural escapement 1 with the energy necessary for its operation rotates in the clockwise direction. The second mobile 2 consequently tends to rotate the pinion 4 and the first escapement wheel 8 on the axis 6 of which is fixed the pinion 4 in the counter-clockwise direction, and the second escapement wheel 12 in the clockwise direction.

Figure 2A:
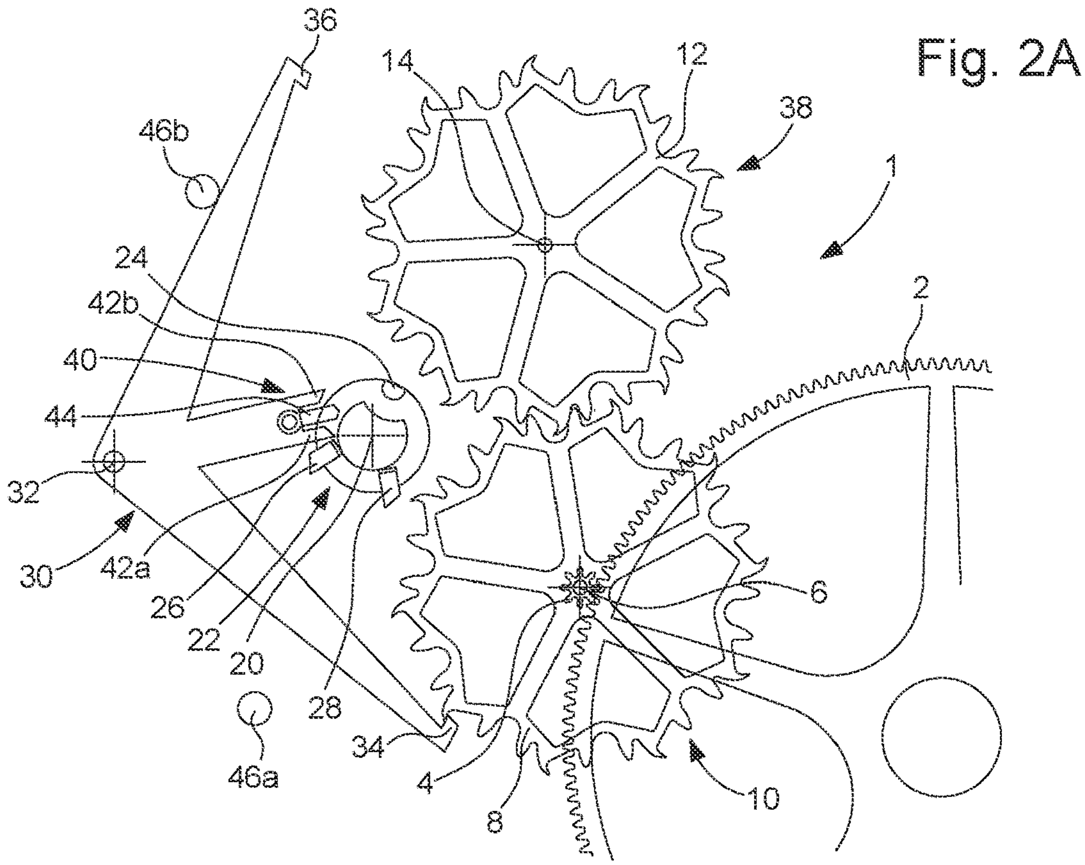
FIG. 2A is a view of the natural escapement in its first extreme position at the start of a cycle.
Figure 2B:
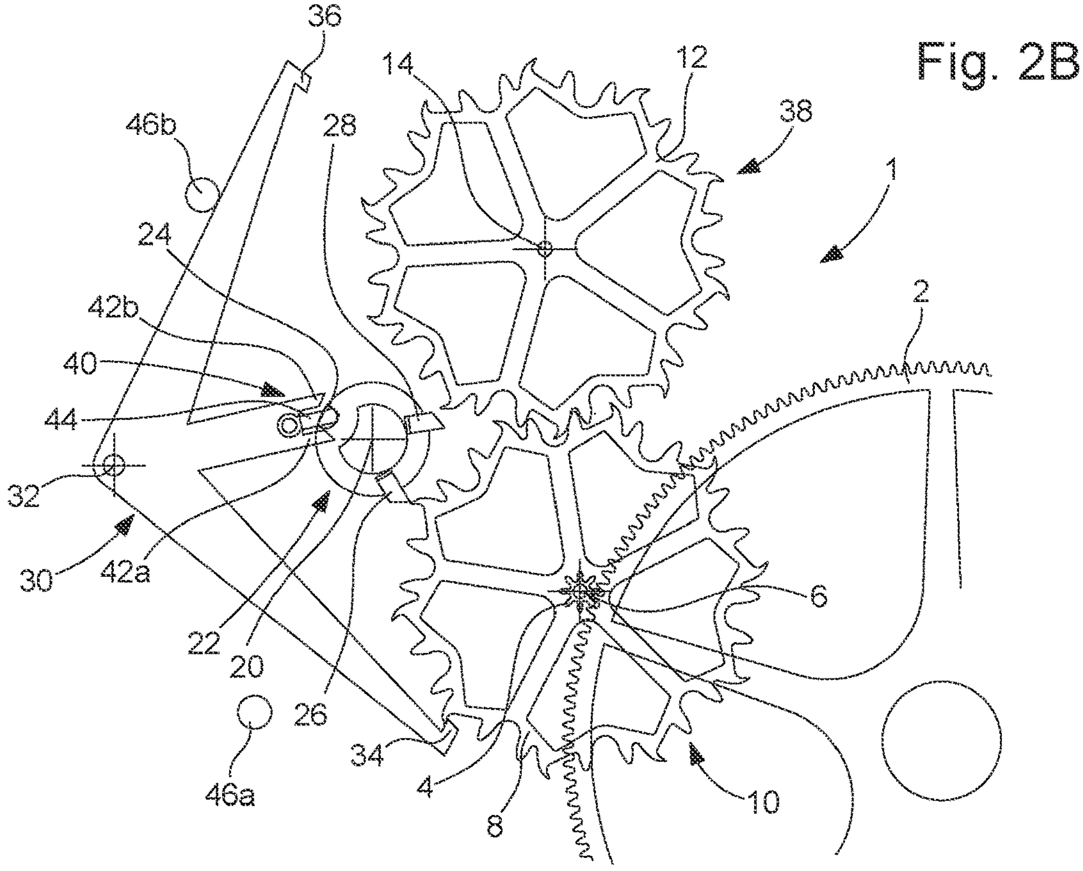
FIG. 2B is a view of the natural escapement in its rest position during the first alternation at the time when the balance plate is about to pivot the anchor.

An operating cycle of the natural escapement 1 according to the invention comprises two alternations during which the balance plate 22 will go successively from a first extreme position to a second extreme position passing through a median rest position, then from its second extreme position to its first extreme position, passing again through its median rest position. Thus, at the start of a cycle (see FIG. 2A), the first escapement wheel 8 is pressed on the first stop pallet 34 and the natural escapement 1 is locked by pressing the anchor 30 against the second abutment 46*b*. Indeed, the angle of draw formed by pressing the tip of the tooth of the first escapement wheel 8 on the first stop pallet 34 opposes a resistance to the release of the anchor 30 by tending to cause this anchor 30 to pivot in the counter-clockwise direction against the second abutment 46*b*. This function of drawing the anchor 30 on the second abutment 46*b* by the first escapement wheel 8 during the free portion of the alternation of the balance plate 22 is similar to that of Swiss lever escapements. The balance plate 22 then leaves this first extreme position by rotating in the counter-clockwise direction. At a given moment of its displacement during the first alternation (see FIG. 2B), the balance plate 22 reaches its median rest position. Just before reaching this position, the balance plate 22 abuts by its balance pin 24 against the first horn 42*a* of the fork 40 and causes the anchor 30 to pivot in the clockwise direction. The clockwise pivoting of the anchor 30 has the effect of releasing the first escapement wheel 8 from its engagement with the first stop pallet 34, which allows the second mobile 2 to drive, via the first escapement wheel 8, the second escapement wheel 12 in the clockwise direction (see FIG. 2C). The pivoting of the second escapement wheel 12 is again interrupted when, under the effect of the pivoting of the anchor 30, this second escapement wheel 12 is pressed on the second stop pallet 36, this position being retained thanks to pressing the anchor 30 against the first abutment 46*a* (see FIG. 2F). Indeed, the angle of draw formed by pressing the tip of the tooth of the second escapement wheel 12 on the second stop pallet 36 opposes a resistance to the release of the anchor 30 by tending to cause this anchor 30 to pivot in the clockwise direction against the first abutment 46*a*. This function of pulling the anchor 30 on the first abutment 46*a* by the second escapement wheel 12 during the free portion of the alternation of the balance plate 22 is similar to that of Swiss lever escapements.

Figure 2C:
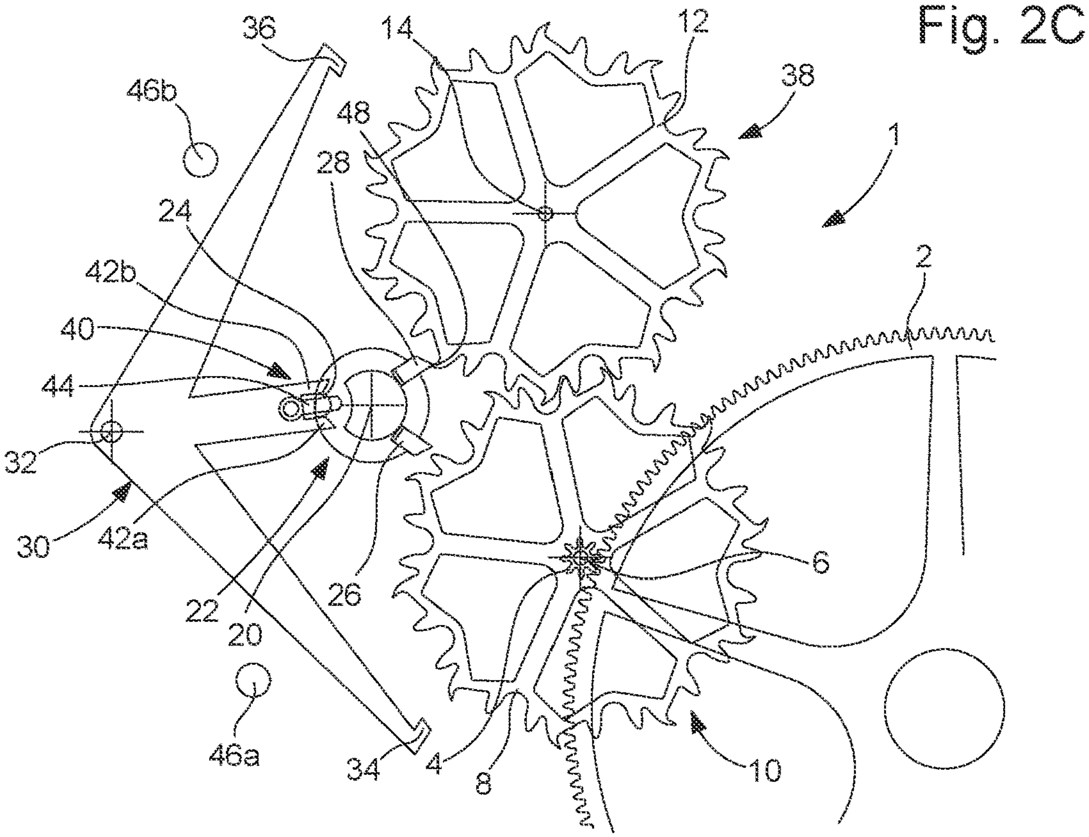
FIG. 2C is a view of the natural escapement at the time when the first escapement wheel is released from its engagement with the first stop pallet, which allows the second mobile to drive, via the first escapement wheel, the second escapement wheel, this second escapement wheel further giving, through its impulse tooth, a driving impulse called direct and tangential to the second impulse pallet of the balance plate.
Figure 2D:
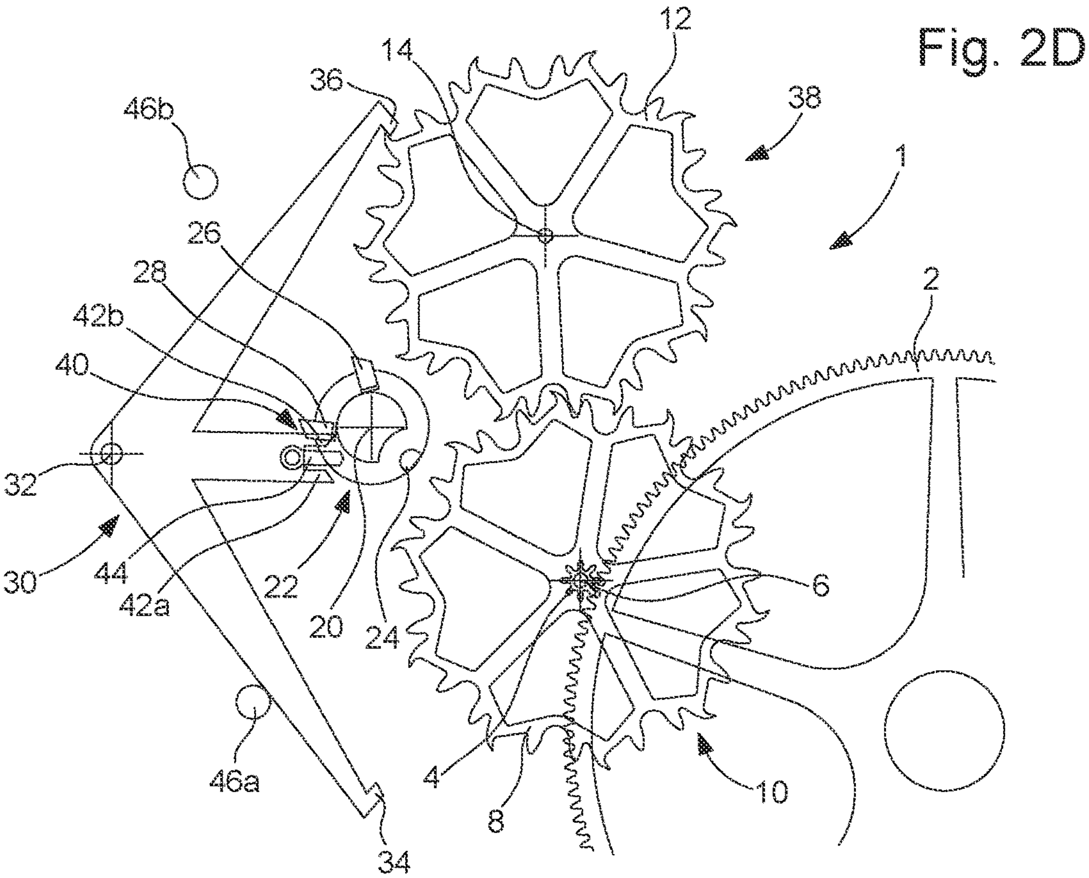
FIG. 2D is a view of the natural escapement at the time when the pivoting of the second escapement wheel is again interrupted when, under the effect of the pivoting of the anchor, this second escapement wheel is pressed on the second stop pallet.
Figure 2E:
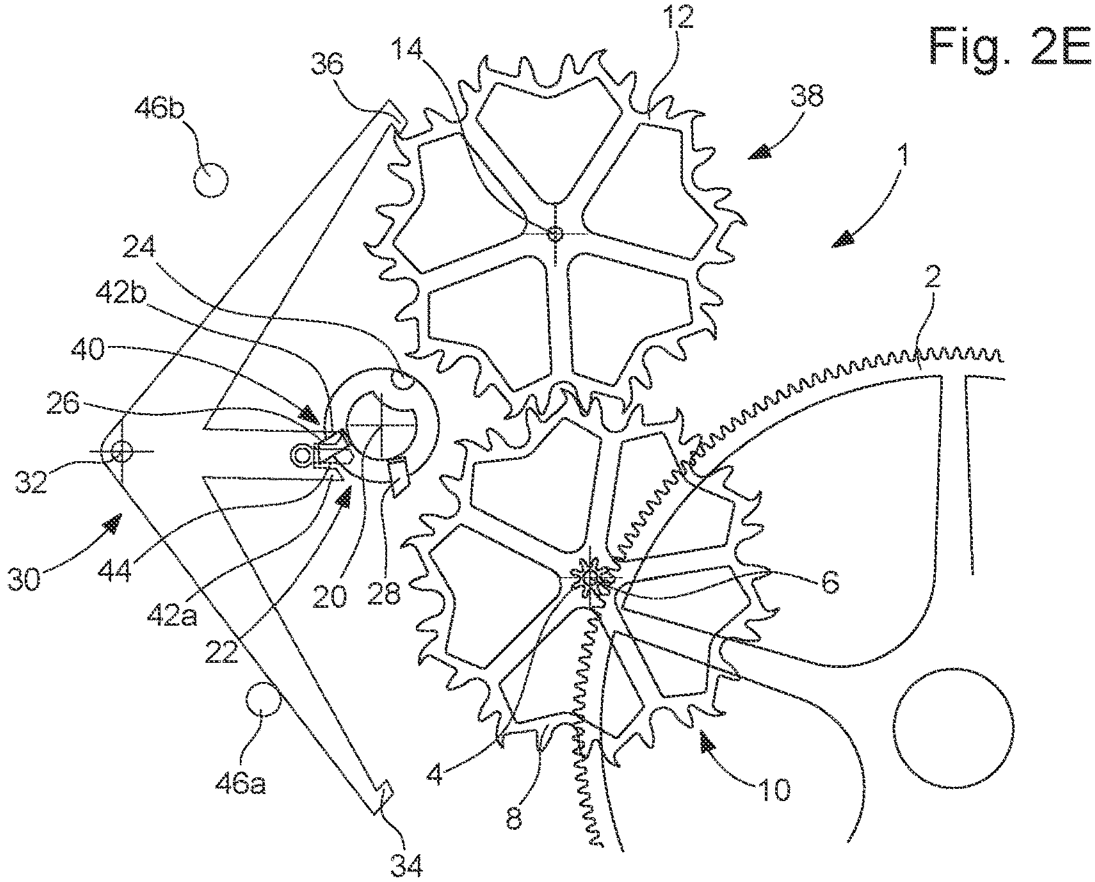
FIG. 2E is a view of the natural escapement at the time when the balance plate is in its second extreme position wherein it is completely removed from its rest position, which marks the end of the first alternation of operation of the natural escapement.

It will be noted that at the same time as the first escapement wheel 8 pivots the second escapement wheel 12 in the clockwise direction, the second escapement wheel 12 also gives a driving impulse to the balance plate 22 via one of its teeth 48, called impulse tooth, which drives the second impulse pallet 28 (see FIG. 2C). This driving impulse is called direct and tangential impulse because it is given directly by the second escapement wheel 12 to the balance plate 22 and the path of the impulse tooth 48 tangentially catches that of the second impulse pallet 28 of the balance plate 22, which allows an almost punctual contact and without friction. The balance plate 22 thus moves to its second extreme position wherein it is completely removed from its rest position, which marks the end of the first alternation of operation of the natural escapement 1 (see FIG. 2E).

Figure 2F:
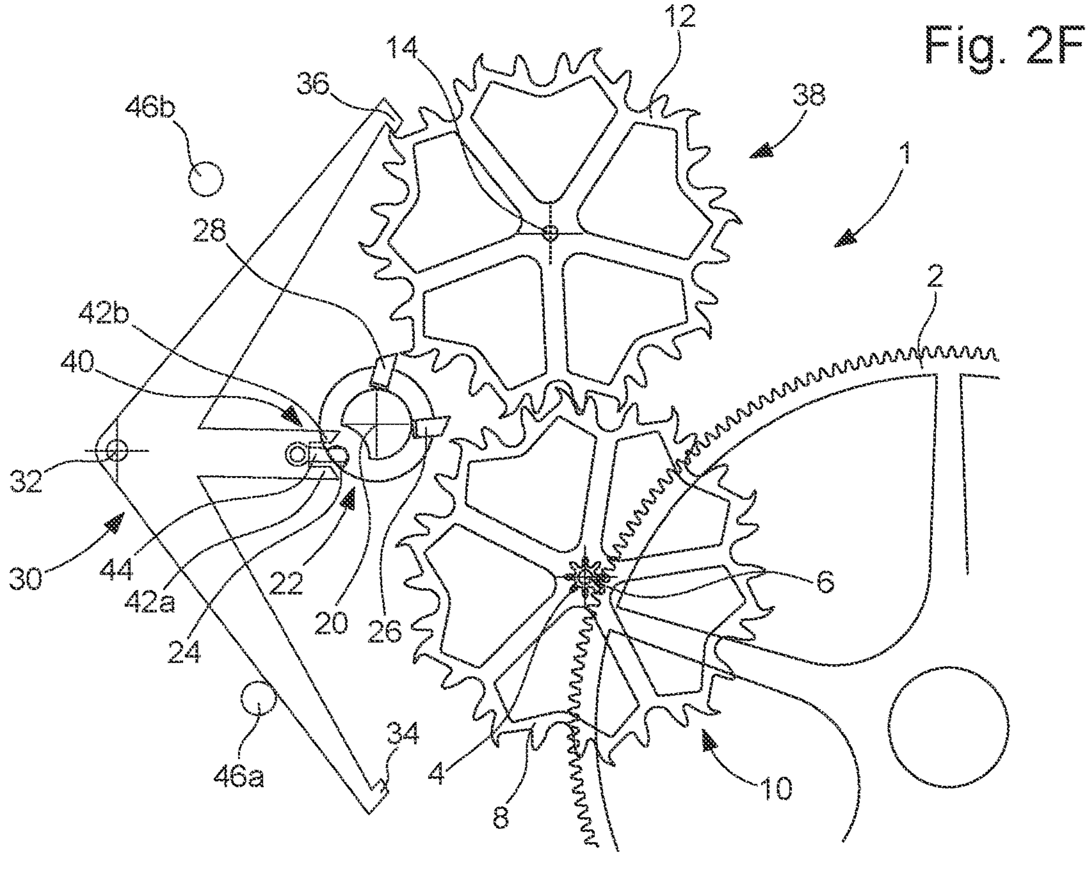
FIG. 2F is a view of the natural escapement at the time when, during the second alternation, the balance plate has returned to its rest position and is about to rotate the anchor again.

At the start of the second alternation of operation of the natural escapement 1, the balance plate 22, recalled by the balance spring of the balance (not visible in the drawing), begins to rotate in the clockwise direction until it abuts by its balance pin 24 against the second horn 42*b* of the fork 40 and causes the anchor 30 to pivot in the counter-clockwise direction (see FIG. 2F). The counter-clockwise pivoting of the anchor 30 has the effect of releasing the second escapement wheel 12 from its engagement with the second stop pallet 36, which allows the second mobile 2 to drive, via the first escapement wheel 8, the second escapement wheel 12 in the clockwise direction (see FIG. 2G). The pivoting of the second escapement wheel 12 is again interrupted when, under the effect of the pivoting of the anchor 30, the first escapement wheel 8 is pressed on the first stop pallet 34, this position being retained thanks to pressing the anchor 30 against the second abutment 46*b* (see FIG. 2H). Indeed, the angle of draw formed by pressing the tip of the tooth of the first escapement wheel 8 on the first stop pallet 34 opposes a resistance to the release of the anchor 30 by tending to cause this anchor 30 to pivot in the counter-clockwise direction against the second abutment 46*b*.

Figure 2G:
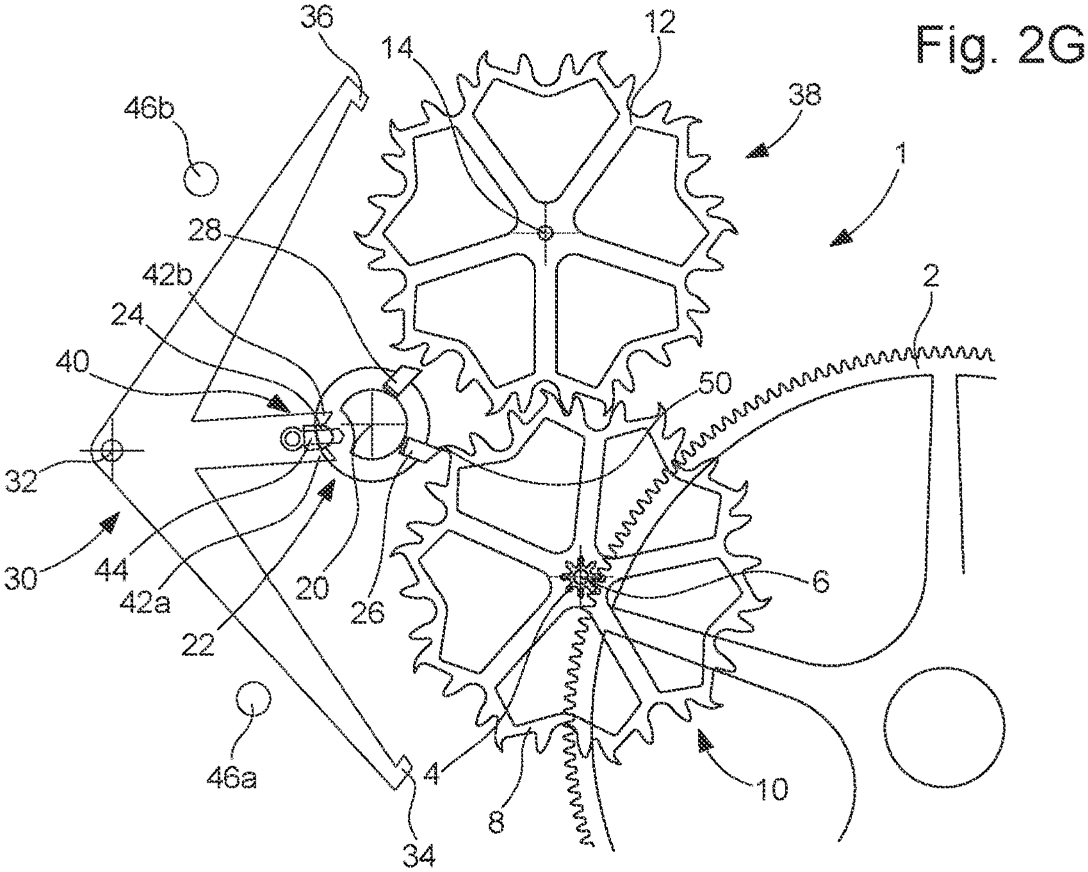
FIG. 2G is a view of the natural escapement at the time when the second escapement wheel is released from its engagement with the second stop pallet, which allows the second mobile to drive, via the first escapement wheel, this second escapement wheel, the first escapement wheel providing a driving impulse called direct and tangential driving impulse to the balance plate via the first impulse pallet.
Figure 2H:
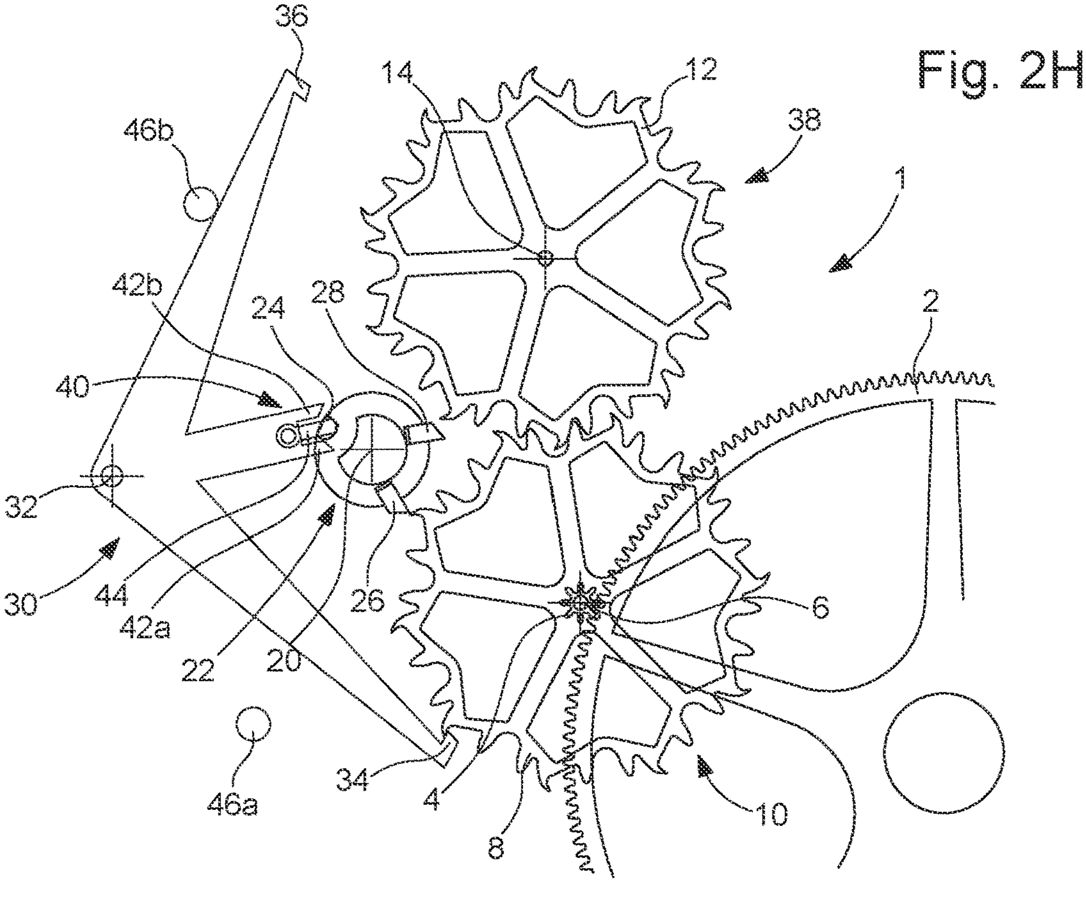
FIG. 2H is a view of the natural escapement at the time when the pivoting of the first escapement wheel is again interrupted when, under the effect of the pivoting of the anchor, this first escapement wheel is pressed on the first stop pallet.
Figure 2L:
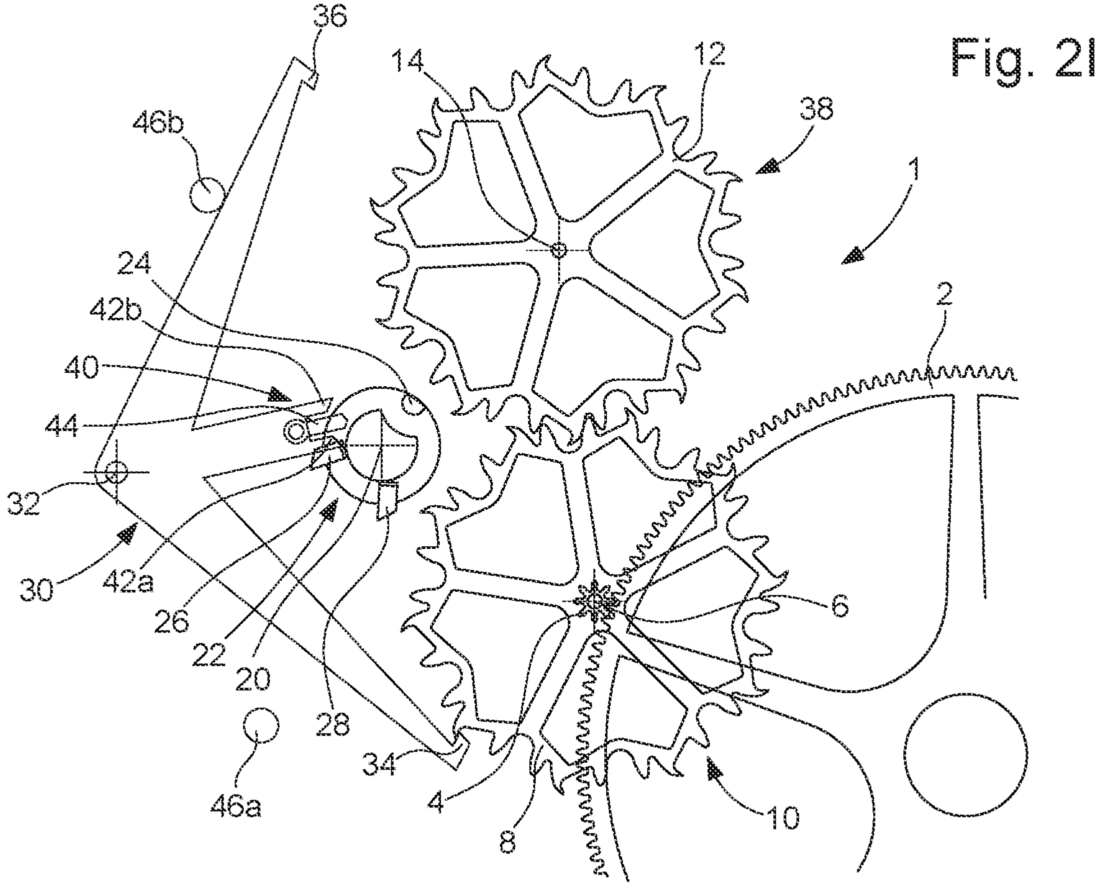
FIG. 2I is a view of the natural escapement returning to its first extreme position, which marks the end of the operating cycle of the natural escapement according to the invention.

It will be noted that at the same time as the first escapement wheel 8 pivots the second escapement wheel 12 in the clockwise direction, the first escapement wheel 8 also gives a driving impulse called direct and tangential to the balance plate 22 via one of its teeth 50 called impulse tooth which drives the first impulse pallet 26 (see FIG. 2G). The impulse is so named because it is given directly by the first escapement wheel 8 to the balance plate 22 and the path of the impulse tooth 50 tangentially catches that of the first impulse pallet 26 of the balance plate 22, which allows an almost punctual contact and without friction. The balance plate 22 thus returns to its first extreme position, which marks the end of an operating cycle of the natural escapement 1 (see FIG. 2I).

It goes without saying that the present invention is not limited to the embodiment which has just been described and that various modifications and simple variants can be considered by the person skilled in the art without departing from the scope of the invention as defined by the claims appended to the present patent application. It will be noted in particular that the function of the first and second abutments 46*a* and 46*b* can also be provided by a specific shape of the first and second stop pallets 34 and 36 and the impulse teeth 48 and 50. It will also be noted that the balance pin 24 is located outside an acute angle β delimited by two straight lines which pass through the axis 20 of the balance wheel 18 and through the first impulse pallet 26, respectively through the second impulse pallet 28.

The invention claimed is:

1. A natural escapement (1) for a horological movement performing a succession of operating cycles each composed of a first and a second alternation of a balance (16) which comprises a balance wheel (18) as well as a balance plate (22) adjusted on an axis (20) of the balance wheel (18), the natural escapement (1) comprising:

a first escapement wheel (8) arranged to be driven by a second mobile (2), the first escapement wheel (8) in turn driving a second escapement wheel (12) arranged in the same plane as the first escapement wheel (8), an anchor (30) configured to pivot around an anchor rod (32), the anchor (30) comprising means for temporarily locking the first escapement wheel (8) during the first alternation, and means for temporarily locking the second escapement wheel (12) during the second alternation, the anchor rod (32) being located outside an angle (α) less than 180° and delimited by first and second straight lines, the first straight line passing through the axis (20) of the balance wheel (18) and through a pivot axis (6) of the first escapement wheel (8), and the second straight line passing through the axis (20) of the balance wheel (18) and through a pivot axis (14) of the second escapement wheel (12).

2. The natural escapement (1) according to claim 1, wherein the anchor (30) comprises a first stop pallet (34) for temporarily locking the first escapement wheel (8) during the first alternation, and a second stop pallet (36) for temporarily locking the second escapement wheel (12) during the second alternation.

3. The natural escapement (1) according to claim 2, wherein the balance plate (22) carries a balance pin (24) by which the balance plate (22) causes the anchor (30) to pivot at each of the first and second alternations, the balance plate (22) also carrying a second impulse pallet (28) through which the balance plate (22) receives a direct and tangential driving impulse from the second escapement wheel (12) during the first alternation, and a first impulse pallet (26) through which the balance plate (22) receives a direct and tangential driving impulse from the first escapement wheel (8) during the second alternation, the balance pin (24) being located outside an acute angle (β) delimited by third and fourth straight lines, the third straight line passing through the axis (20) of the balance wheel (18) and through the first impulse pallet (26), and the fourth straight line passing through the axis (20) of the balance wheel (18) and through the second impulse pallet (28).

4. The natural escapement (1) according to claim 3, wherein the first escapement wheel (8) comprises a toothing (10) which extends in a single plane and through which the first escapement wheel (8) meshes with the second escapement wheel (12) and provides the direct and tangential driving impulse to the balance plate (22) during the second alternation.

5. The natural escapement (1) according to claim 4, wherein the second escapement wheel (12) comprises a toothing (38) which extends in a single plane and through which the second escapement wheel (12) meshes with the first escapement wheel (8) and provides the direct and tangential driving impulse to the balance plate (22) during the first alternation.

6. The natural escapement (1) according to claim 1, wherein the balance plate (22) carries a balance pin (24) by which the balance plate (22) causes the anchor (30) to pivot at each of the first and second alternations, the balance plate (22) also carrying a second impulse pallet (28) through which the balance plate (22) receives a direct and tangential driving impulse from the second escapement wheel (12) during the first alternation, and a first impulse pallet (26) through which the balance plate (22) receives a direct and tangential driving impulse from the first escapement wheel (8) during the second alternation, the balance pin (24) being located outside an acute angle (β) delimited by third and fourth straight lines, the third straight line passing through the axis (20) of the balance wheel (18) and through the first impulse pallet (26), and the fourth straight line passing through the axis (20) of the balance wheel (18) and through the second impulse pallet (28).

7. The natural escapement (1) according to claim 6, wherein the first escapement wheel (8) comprises a toothing (10) which extends in a single plane and through which the first escapement wheel (8) meshes with the second escapement wheel (12) and provides the direct and tangential driving impulse to the balance plate (22) during the second alternation.

8. The natural escapement (1) according to claim 7, wherein the second escapement wheel (12) comprises a toothing (38) which extends in a single plane and through which the second escapement wheel (12) meshes with the first escapement wheel (8) and provides the direct and tangential driving impulse to the balance plate (22) during the first alternation.

9. The natural escapement (1) according to claim 1, wherein the anchor (30) comprises a fork (40) formed of a first and a second horn (42*a*, 42*b*), the balance plate (22) abutting by its balance pin (24) against the first horn (42*a*) of the fork (40) and causing the pivoting of the anchor (30)

in a first direction during the first alternation, and against the second horn (42*b*) during the second alternation, causing the anchor (30) to pivot in a second direction opposite to the first direction.

10. The natural escapement (1) according to claim 9, wherein the fork (40) carries a dart (44) which cooperates with the balance plate (22) to prevent accidental movements of the fork (40).

11. The natural escapement (1) according to claim 1, wherein the first and second escapement wheels (8, 12) are each made in one piece and each comprise a single level of toothing.

12. A horological movement comprising a natural escapement (1) according to claim 1.

* * * * *